Jan. 9, 1962 E. BRUNNER 3,016,317
RESILIENT MAT
Filed June 19, 1958

INVENTOR.
Emil Brunner
BY Michael S. Striker
ATTORNEY

United States Patent Office 3,016,317
Patented Jan. 9, 1962

3,016,317
RESILIENT MAT
Emil Brunner, Sins, Aargau, Switzerland
Filed June 19, 1958, Ser. No. 743,161
Claims priority, application Switzerland June 21, 1957
10 Claims. (Cl. 154—49)

The present invention relates to a resilient mat, more particularly, it relates to a gymnastic mat or the like.

It is an object of the present invention to provide a lightweight mat of controlled resiliency. It is also the object of the present invention to provide a lightweight resilient mat which can be produced in a simple and economical manner. It is the further object of the present invention to provide a lightweight resilient mat which can be easily cleaned.

It is still another object of the present invention to provide a lightweight resilient mat having sufficient resiliency for gymnastic purposes, preferably for jumping, which mat will possess great flexibility and can be rolled up when the same is to be stored.

Other objects and advantages of the present invention will become apparent from a further reading of the description and the appended claims.

With the above and other objects in view, the present invention mainly consists in a resilient mat, comprising, in combination, a relatively thin sheet of closed cell cellular thermoplastic material having at least one face formed with a plurality of grooves therein, the depth of the grooves being considerably less than the thickness of the sheet, and a thin, continuous cover sheet of thermoplastic material formed with a plurality of holes therethrough covering and firmly adhering throughout to the one grooved face of the sheet of thermoplastic material.

Thus, a gymnastic mat according to the present invention will consist of a resilient closed cell cellular sheet having a thickness of for instance between 10 and 60 mm., and being formed on both faces with grooves arranged in two series of parallel grooves which series cross-sect each other at right angles. Onto one face of the sheet, a perforated thermoplastic film is adhered so as to conform to the grooved configuration of said face and so as to adhere to the same throughout. The thermoplastic film is washable which allows for easy cleaning. The mat, when in use, is placed on the floor or the like with the film-covered face extending upwardly so that the person carrying out gymnastic exercises, such as jumping down from a gymnastic apparatus, will come in contact with the film-covered face of the resilient mat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
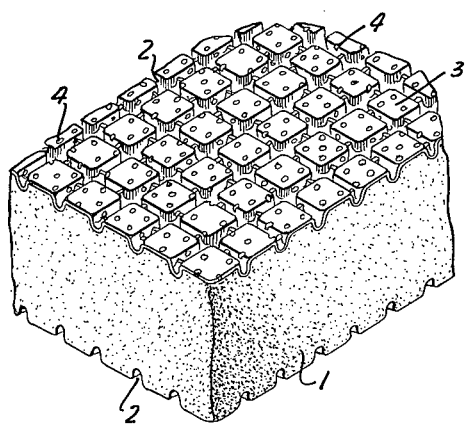
FIG. 1 is a fragmentary perspective view of a mat according to the present invention.

Referring now to the drawing, and particularly to FIG. 1, the mat is shown to consist of a sheet 1 of closed cell cellular thermoplastic material, preferably having a thickness of about 30 mm. Mats having a thickness of between 20 and 200 mm. have been used successfully for various applications, and the mat according to the present invention is not to be considered limited to any specific thickness, although it is essential that the mat is thick enough to offer sufficient resiliency, and it is desirable that the mat is flexible enough so that the same can be rolled up.

The mat is formed on both faces with grooves 2 which according to the illustrated preferred embodiment are arranged in two series of parallel grooves, the grooves of one series cross-secting the grooves of the other series at right angles.

Figure 2:
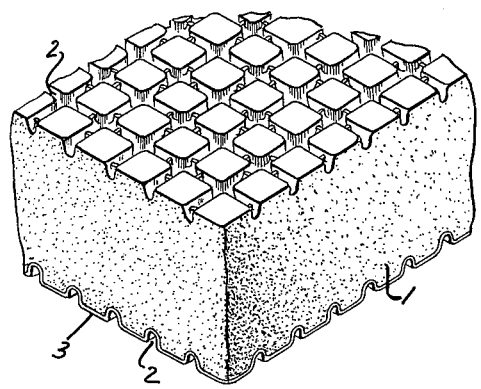
FIG. 2 is a fragmentary perspective view of a mat according to the present invention shown in the reversed position relative to FIG. 1.

The upper face of mat 1, as shown on the top of FIG. 1 and on the bottom of FIG. 2, is covered with a film-like sheet 3, formed with a plurality of holes 4. Sheet 4 is adhesively adhered to the entire grooved upper face of the mat, while the grooved lower face of mat 1 is preferably kept exposed and not covered with sheet 3. This can be clearly seen in FIG. 2, wherein the mat is shown upside down with film-like covering sheet 3 facing downwardly.

It is of course within the scope of the present invention to form mat 1 with grooves on one face only, which face is then covered by film-like cover sheet 3, or to form mat 1 with grooves on both faces, and both grooved faces of the mat covered with film-like cover sheets 3. However, it is preferred to form the resilient mat as illustrated so as to comprise a closed cell cellular mat formed with grooves at both of its faces and with one of its faces only covered by a perforated film-like cover sheet firmly adhering to said one face throughout.

Figure 3:
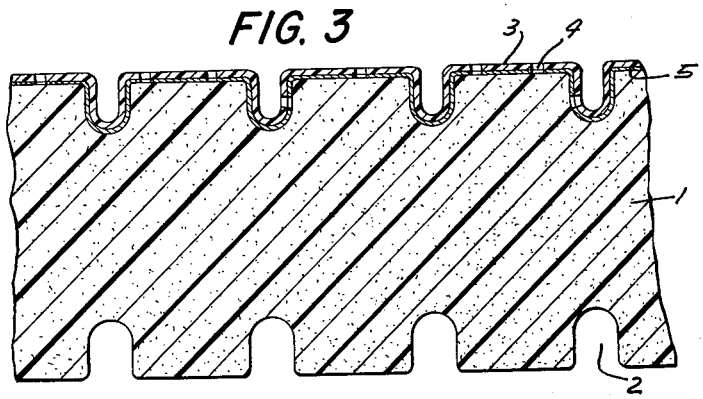
FIG. 3 is a fragmentary elevational view in cross section of the mat according to the present invention.
Figure 4:
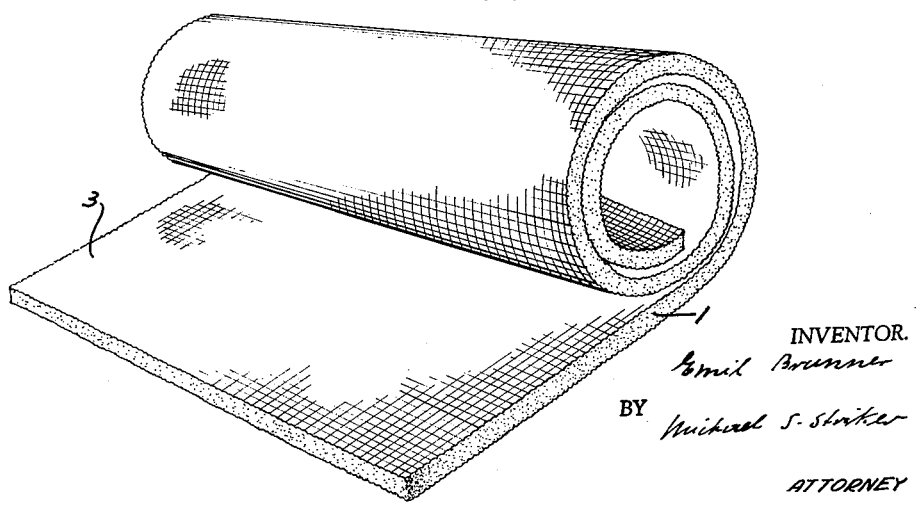
FIG. 4 is a perspective view of the mat according to the present invention in partially rolled-up condition.

In FIG. 3, the adhesive adhering film-like cover sheet 3 to closed cell cellular sheet 1 is illustrated as a distinct layer 5 between continuous cover sheet 3 and cellular sheet 1. It will be understood, however, that the adhesive layer usually blends with the two sheets adhered by it to each other so that the adhesive does not appear as a distinct layer in many cases.

Due to the fact that sheet 1 consists of closed air-filled cells, a lightweight mat is obtained which possesses an excellent cushioning effect even when sheet 1 is relatively thin. For instance, excellent results are obtained with a gymnastic mat according to the present invention having a thickness of 30 mm.

Due to the profiling of the upper and lower faces of the mat, the same possesses extraordinary flexibility and can be easily rolled up without causing the formation of folds or cracks.

The continuous plastic cover sheet, covering the upper face of the mat and coming in contact for instance with the shoes of the gymnast and which consequently is exposed to dirt, can be easily washed.

The holes or perforations in cover sheet 3 allow to a limited degree the exchange of gas between the cellular material and the outer atmosphere. Without such perforations 4 in cover sheet 3 the danger would exist that, for instance upon exposure to sunlight, gas diffusing from the closed cells would break the tight bond between closed cell sheet 1 and continuous thin cover sheet 3. The difference between the gas pressure in the interior of the closed cells and the outside atmosphere can thus be slowly equalized by diffusion without changing the dimensions or harming the appearance of the mat.

Preparing of the cellular sheet so as to form grooves in both faces of the same and so as to simultaneously adhere to one of said faces thin cover sheet 3, can be carried out in manner by placing a perforated thin thermoplastic film on one face of the closed cell cellular thermoplastic sheet under interposition of a suitable adhesive in powder form, and by subsequently compressing the thus arranged structure in conventional manner under application of heat and light pressure, the thereby formed grooves corresponding to the profiles of the press plates.

In addition to being excellently suitable as a gymnastic mat, the mat according to the present invention may also find many other uses wherever a water impervious soft, shape-retaining and washable covering or support is required, for instance as ground covering in tents, etc.

Preferably the mat will not be thinner than 20 mm. Maximum thickness of the mat depends on economic considerations, i.e., the price of the finished mat and on the specific purpose for which the mat is to be used. Generally it will not be necessary to increase the thickness of the mat to beyond 60 mm. However, when a particularly strong cushioning effect is required such as might for instance be required when the mat is to be used by trapeze artists in a circus, thicker mats of for instance 200 mm. thickness may be advantageously used.

The grooves in the upper and lower faces of the mat preferably have a depth and width of between 1 and 10 mm. and most preferably of between 2 and 5 mm.

The distance of individual parallel grooves is preferably maintained at between 1 and 10 mm., and most preferably at about 5 mm.

The diameter of the closed cells of mat 1, preferably is kept at between 0.01 and 2 mm.

The mat according to the present invention may be produced of any suitable thermoplastic material. Good results have been obtained by forming closed cell mat 1 of polyvinyl chloride containing up to 50% softeners or of mixed polymerizates of vinyl chloride and vinyl acetate containing between 80 and 95% vinyl chloride and between 20 and 5% vinyl acetate, or of mixed polymerizates of vinylidene chloride containing between 90 and 50% vinyl chloride and between 10 and 50% vinylidene chloride, or of mixed polymerizates of vinyl chloride with between 5 and 10% of either acrylonitrile or acrylic ester. All these mixed polymerizates may advantageously contain up to 20% softeners.

The following softeners which may be used are listed by way of example only: Dioctyl phthalate, dibutyl phthalate, tricresyl phosphate, and sebacic acid ester.

Perforated cover sheet 3 may be formed of the same thermoplastic materials as closed cell mat 1.

The perforations or holes 4 in perforated film-like cover sheet 3 preferably have diameters of between 0.3 and 5 mm., and preferably are spaced from each other at a distance of from between about 2 to 10 mm.

Preferably film-like cover sheet 3 has a thickness of between 0.1 and 1 mm.

Closed cell mat 1 and film-like cover sheet 3 can be adhered to each other by interposition of any adhesive, preferably pulverulent, latent adhesive which is compatible with both sheets.

Thus, mixed polymerizates consisting of 75% vinyl chloride and 25% vinyl acetate have been used advantageously as adhesive material. However, it is also possible to employ as adhesive a hardenable resin such as melamine, phenolic resins or epoxy resins, which resins harden during the heat-shaping of the mat and thereby adhere the two sheets to each other. The adhesive can be applied in various manners, for instance by dusting a pulverulent powder onto one face of closed cell sheet 1 prior to placing cover film 3 onto the same, or a thin film of adhesive material can be interposed between the two sheets. It is also within the scope of the present invention to dissolve the adhesive in a solvent and to coat one or both contacting faces of the two sheets with the dissolved adhesive, allowing the solvent to evaporate and thereafter placing the adhesive-coated sheets upon each other prior to heat and pressure deformation of the same.

The following examples are given as illustrative only of the method of producing the resilient mat of the present invention without, however, in any way limiting the present invention to any of the specific details of the examples.

*Example I*

A closed cell cellular sheet formed with closed cells having a diameter of between 0.1 and 1.0 mm. and consisting of polyvinyl chloride with 40% dibutyl phthalate, having a length of 2 meters, a width of 1 meter and a thickness of 30 mm., the specific gravity of the closed cell cellular sheet being 0.1, is covered on one face with a perforated continuous film having a thickness of 0.3 mm. and a width and length equal to the width and length of the cellular sheet. The perforated continuous film consists of the same material as the closed cell cellular sheet. The perforations in the film have a diameter of 0.5 mm. and are arranged at a distance of 10 mm. from each other. Between the film and the closed cell cellular sheet, pulverulent adhesive is interposed consisting of a mixed polymerizate of 80% vinyl chloride and 20% vinyl acetate.

The thus prepared composite structure is inserted into a press having profiled press plates and is compressed therein at a temperature of about 110° C. and at a pressure of preferably about 6 atmospheres. It is possible, depending on the specific conditions, to vary the pressure between 2 and 10 atmospheres. The profiles on the press plates consist of 2 series of parallel extensions extending along the width and breadth of the press plates, each having a width of 4 mm. and a height of 3 mm.

In this manner, a mat is obtained which has an overall thickness of about 30 mm. and which is formed on both faces with 3 mm. deep and 4 mm. wide grooves, and having the perforated film firmly adhering to and covering one of the grooved faces.

*Example II*

In similar manner, it is possible to produce for instance a mat having a thickness of 60 mm. from a closed cell cellular sheet consisting of a mixed polymerizate of 90% vinyl chloride and 10% vinyl acetate plus 10% dicresyl phosphate. The closed cell sheet is covered, prior to press-forming the grooves therein, with a perforated film of polyvinyl chloride having a thickness of 0.2 mm., and the adhesive of Example I is interposed between sheet and film.

*Example III*

A mat of about 100 mm. thickness is produced from a closed cell cellular sheet consisting of a mixed polymerizate of 50% vinyl chloride and 50% vinylidene chloride. One face of the closed cell cellular sheet is dusted with the adhesive and then covered with a perforated film of 0.3 mm. thickness, also consisting of a mixed polymerizate of 50% vinyl chloride and 50% vinylidene chloride. In view of the greater thickness of this mat, it is preferred to form the same with profiles of somewhat large dimensions, for instance grooves having a thickness and depth of 5 mm. and to space the parallel grooves 20 mm. apart from each other.

It will be understood that each of the elements described above, or two or more together, may also find a useful application in other types of resilient mats differing from the types described above.

While the invention has been illustrated and described as embodied in a gymnastic mat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A resilient mat comprising, in combination, a sheet of gas-filled cellular material having a top face and a bottom face, each of said faces of said sheet having spaced grooves therein extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of gas from the cells of the cellular material of said region adjacent said covered top face during rolling up of the mat.

2. A resilient mat comprising, in combination, a sheet of air-filled cellular material having a thickness of at least 20 mm. and having a top face and a bottom face, each of said faces of said sheet having spaced grooves therein extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

3. A resilient mat comprising, in combination, a sheet of air-filled cellular material having a thickness of about 30 mm. and having a top face and a bottom face, each of said faces of said sheet having spaced grooves therein extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

4. A resilient mat comprising, in combination, a sheet of air-filled cellular material having a thickness of at least 20 mm. and having a top face and a bottom face, each of said faces of said sheet having spaced grooves therein having a depth of between about 2 and 5 mm. extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

5. A resilient mat comprising, in combination, a sheet of air-filled cellular material having a thickness of at least 20 mm. and having a top face and a bottom face, each of said faces of said sheet having spaced grooves therein extending parallel to each other and parallel to the grooves in the other of said faces said grooves being spaced between 1 and 10 mm. from each other; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

6. A resilient mat comprising, in combination, a sheet of air-filled cellular material having a thickness of at least 20 mm. and having a top face and a bottom face, each of said faces of said sheet having spaced grooves therein extending parallel to each other and parallel to the grooves in the other of said faces said grooves being spaced about 5 mm. from each other; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

7. A resilient mat comprising, in combination, a sheet of air-filled cellular material having a thickness of at least 20 mm. and having a top face and a bottom face, each of said faces of said sheet having two series of spaced parallel grooves therein, the depth of the grooves being between 2 and 5 mm. and the grooves of one series cross-secting the grooves of the other series said parallel grooves of each face being arranged at a distance of between 1 and 10 mm. from each other and the grooves in one face extending parallel to the grooves of the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein permitting escape of air from the cells of the cellular material of said region adjacent said covered top face during rolling up of the mat.

8. A resilient mat comprising, in combination, a sheet of air-filled cellular material having a thickness of at least 20 mm. and having a top face and a bottom face, each of said faces of said sheet having spaced grooves therein extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a plurality of spaced holes therein having diameters of between 0.3 and 5 mm. and being spaced from each other at a distance of between 2 and 10 mm. permitting escape of air from the cells of the cellular material of said region adjacent said covered top face during rolling up of the mat.

9. A resilient mat comprising, in combination, a sheet of air-filled cellular material having a thickness of at least 20 mm. and having a top face and a bottom face, each of said faces of said sheet having spaced grooves therein extending parallel to each other and parallel to the grooves in the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a thickness of between 0.1 and 1 mm. and having a plurality of spaced holes therein permitting escape of air from the cells of the cellular material of said region adjacent said covered top face during rolling up of the mat.

10. A resilient mat comprising, in combination, a sheet of air-filled cellular material having a thickness of at least 20 mm. and having a top face and a bottom face, each of said faces of said sheet having two series of spaced parallel grooves therein, the depth of the grooves being between 2 and 5 mm. and the grooves of one series cross-secting the grooves of the other series of said parallel grooves of each face being arranged at a distance of between 1 and 10 mm. from each other and the grooves in one face extending parallel to the grooves of the other of said faces; a thin continuous cover sheet covering and firmly adhering to said grooved top face of said sheet so as to conform also to and cover the faces of the grooves therein in their entirety, said grooves in said covered top face permitting compression of the region of said sheet adjacent said covered top face thereof during rolling up of said mat with said covered top face located facing inwardly and said grooves in said grooved bottom face permitting expansion of the region of said sheet adjacent said grooved outer face facing outwardly during said rolling up of the mat, said continuous cover sheet having a thickness of between 0.1 and 1 mm. and having a plurality of spaced holes therein having diameters of between 0.3 and 5 mm. and being spaced from each other at a distance of between 2 and 10 mm. permitting escape of air from the cells of the cellular material of said region adjacent said covered top face during rolling up of the mat.

References Cited in the file of this patent

UNITED STATES PATENTS

| | | |
|---|---|---|
| 2,646,797 | Scholl | July 28, 1953 |
| 2,698,272 | Clapp et al. | Dec. 28, 1954 |
| 2,744,340 | Gerber | May 8, 1956 |
| 2,760,881 | Toulmin | Aug. 28, 1956 |
| 2,816,852 | Banks | Dec. 17, 1957 |

FOREIGN PATENTS

| | | |
|---|---|---|
| 181,766 | Switzerland | Mar. 16, 1936 |
| 754,952 | Great Britain | Aug. 15, 1956 |
| 765,713 | Great Britain | Jan. 9, 1957 |